(12) United States Patent
Calman et al.

(10) Patent No.: US 8,668,498 B2
(45) Date of Patent: Mar. 11, 2014

(54) REAL-TIME VIDEO IMAGE ANALYSIS FOR PROVIDING VIRTUAL INTERIOR DESIGN

(75) Inventors: Matthew A. Calman, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 112 days.

(21) Appl. No.: 13/342,066

(22) Filed: Jan. 1, 2012

(65) Prior Publication Data

US 2012/0231424 A1 Sep. 13, 2012

Related U.S. Application Data

(60) Provisional application No. 61/450,213, filed on Mar. 8, 2011, provisional application No. 61/508,969, filed on Jul. 18, 2011.

(51) Int. Cl.
*G09B 25/00* (2006.01)

(52) U.S. Cl.
USPC .................................. 434/80; 434/72; 434/79

(58) Field of Classification Search
USPC ................................................ 434/72, 79, 80
See application file for complete search history.

(56) References Cited

U.S. PATENT DOCUMENTS

| | | | |
|---|---|---|---|
| 6,925,196 B2 * | 8/2005 | Kass et al. | 382/111 |
| 7,016,532 B2 | 3/2006 | Boncyk et al. | |
| 7,155,228 B2 | 12/2006 | Rappaport et al. | |
| 7,403,652 B2 | 7/2008 | Boncyk et al. | |
| 7,412,081 B2 | 8/2008 | Doi | |
| 7,424,303 B2 | 9/2008 | Al-Sarawi | |
| 7,477,780 B2 | 1/2009 | Boncyk et al. | |
| 7,526,280 B2 | 4/2009 | Jung et al. | |
| 7,564,469 B2 | 7/2009 | Cohen | |
| 7,565,008 B2 | 7/2009 | Boncyk et al. | |
| 7,680,324 B2 | 3/2010 | Boncyk et al. | |
| 7,775,437 B2 | 8/2010 | Cohen | |
| 7,792,738 B2 | 9/2010 | Channell | |
| 7,881,529 B2 | 2/2011 | Boncyk et al. | |
| 7,899,243 B2 | 3/2011 | Boncyk et al. | |

(Continued)

OTHER PUBLICATIONS

International Search Report and Written Opinion dated Oct. 12, 2012 for International Application No. PCT/US1248697.

(Continued)

*Primary Examiner* — Kesha Frisby
(74) *Attorney, Agent, or Firm* — Michael A. Springs; Moore & Van Allen, PLLC; Nicholas C. Russell

(57) ABSTRACT

System, method, and computer program product are provided for using real-time video analysis, such as augmented reality, to assist a user of a mobile device with interior design. Through the use of real-time object recognition features, logos, artwork, products, locations, etc. can be recognized in a real-time video stream and can subsequently be matched with data associated with such to assist the user with selecting the proper design elements for a space, such as a kitchen. The proper design elements may be based off of several factors regarding the design space, include the dimensions of the space, the location of windows, doors and outlets, geographic and positional data, other space features, current design elements, architectural features, décor, and style data of the space, etc. This invention provides a virtual area with design elements, such that a user may view the area and determine the proper décor for the area.

39 Claims, 7 Drawing Sheets

(56) References Cited

U.S. PATENT DOCUMENTS

| | | |
|---|---|---|
| 7,899,252 B2 | 3/2011 | Boncyk et al. |
| 8,138,930 B1 | 3/2012 | Heath |
| 2002/0006602 A1* | 1/2002 | Masters .................. 434/72 |
| 2003/0064705 A1 | 4/2003 | Desiderio |
| 2004/0021584 A1 | 2/2004 | Hartz, Jr. et al. |
| 2004/0024709 A1 | 2/2004 | Yu et al. |
| 2006/0100951 A1 | 5/2006 | Mylet et al. |
| 2007/0140595 A1 | 6/2007 | Taylor et al. |
| 2008/0040278 A1 | 2/2008 | DeWitt |
| 2008/0070198 A1* | 3/2008 | Dempsey .................. 434/72 |
| 2008/0214210 A1 | 9/2008 | Rasanen et al. |
| 2008/0268876 A1 | 10/2008 | Gelfand et al. |
| 2009/0094125 A1 | 4/2009 | Killian et al. |
| 2009/0102859 A1 | 4/2009 | Athsani et al. |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0204511 A1 | 8/2009 | Tsang |
| 2009/0250515 A1 | 10/2009 | Todd et al. |
| 2010/0130226 A1 | 5/2010 | Arrasvuori et al. |
| 2010/0185529 A1 | 7/2010 | Chesnut et al. |
| 2010/0250581 A1 | 9/2010 | Chau |
| 2011/0022540 A1 | 1/2011 | Stern et al. |
| 2011/0034176 A1 | 2/2011 | Lord et al. |
| 2011/0119155 A1 | 5/2011 | Hammad et al. |
| 2011/0202466 A1 | 8/2011 | Carter |

OTHER PUBLICATIONS

International Search Report and Written Opinion for International Application No. PCT/US12/27890 mailed Feb. 5, 2013.
PCT International Search Report and Written for International Application No. PCT/US 12/28008 dated May 22, 2012.
PCT International Search Report and Written Opinion for International Application No. PCT/US 12/28036 dated May 28, 2012.
PCT International Search Report and Written Opinion for International Application No. PCT/US2012/027912 dated Jun. 8, 2012
PCT International Search Report and Written Opinion for International Application No. PCT/US 12/27892 dated Jun. 14, 2012.

* cited by examiner

REAL-TIME VIDEO IMAGE ANALYSIS FOR PROVIDING VIRTUAL INTERIOR DESIGN

CLAIM OF PRIORITY UNDER 35 U.S.C. §119

This Non-provisional patent application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/508,969 titled "Real-Time Video Image Analysis for Providing Virtual Interior Design" filed on Jul. 18, 2011, assigned to the assignee hereof and hereby expressly incorporated by reference herein.

BACKGROUND

Home owners and renters have many options when it comes to furnishing and decorating their homes or apartments. Home owners may add design elements such as furniture, paint, flooring, lighting, decorations, and/or the like to their homes to enhance the look of their home and make the home unique to the home owner. Furthermore, there are many options for each of these design elements. For example, a coffee table may come in many different sizes, shapes, colors, with accessories, with drawers, etc. There are so many options that there are retails stores solely dedicated to design elements. Furthermore, selecting and positioning these design elements can be a difficult task for most home owners. In fact, many home owners turn to professional interior designers to design rooms of their home.

Many factors may play a role in interior design. For example, a home owner's background, likes/dislikes, dimensions of a room, location of the home, and the like all play a role in which design elements a person selects for their home. Even with advances in technology, knowing the design that the home owner may like the best may be a challenging task, even for the home owner.

Today, modern handheld mobile devices, such as smart phones or the like, have the capability to facilitate payment for a cup of coffee or provide a boarding pass for a flight. These advances combine multiple technologies through a handheld mobile device to provide a user with an array of capabilities. For example, many smart phones are equipped with significant processing power, sophisticated multi-tasking operating systems, and high-bandwidth Internet connection capabilities. Moreover, such mobile devices often have additional features that are becoming increasingly more common and standardized features. Such features include, but are not limited to, location-determining devices, such as Global Positioning System (GPS) devices; compasses sensor devices, such as accelerometers; and high-resolution video cameras.

As the capabilities of such mobile devices have increased, so too have the applications (i.e., software) that can be used with mobile devices. One such example of innovative software is a category known as augmented reality ("AR"), or more generally referred to as mediated reality. One such example of an AR presentment application platform is Layar, available from Layar, Amsterdam, the Netherlands. The Layar platform technology analyzes location data, compass direction data, and the like in combination with information related to the objects, locations or the like in the video stream to create browse-able "hot-spots" or "tags" that are superimposed on the mobile device display, resulting in an experience described as "reality browsing".

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for using real-time video analysis, such as AR or the like to assist the user of mobile devices with designing or decorating an interior space.

Using real-time video analysis, such as augmented reality or the like, the user may capture information regarding a defined design space, such as the user's property around his/her house. The system reviews the captured information and provides the user of mobile device virtual interior design information, such as indications of design elements that may fit within the design space and conform to the overall look of the space, prior to the user actually moving the design elements into the design space and visualizing the completely designed and furnished MOM.

Interior design information may be provided to a user based on an analysis of several factors relating to the captured design space the user wishes to receive design ideas. These factors include the dimensions of the space, the location of windows within the space, the location of doors within the space, the location of outlets (electrical, communication, television, and the like) within the space, current design elements in the space (e.g., furniture, pictures, drapes, carpet, rugs, flooring (hardwoods, parquet, etc.), architectural features (columns, bay windows, etc.), etc.), décor (color schemes, design style, etc.) and/or other features found within the space. The style of the current room design may also be captured as a factor, such as contemporary, arts and crafts, classic, etc. Further, geographic and positional information may be of importance, as determined via GPS and compass of the mobile device capturing the image. The geographic location of the room may aid in determining design styles, types of fabrics, etc. For example, a room located near a beach may be more apt for cottage or beach designs. A room located in a geographic area in cold climes may be more apt for design elements imbuing a sense of warmth. Compass direction of the mobile device capturing the photo or image may be an aid in determining which direction the windows in the space face for indications of lighting, shading, and heat exposure to decorative elements.

Based on these factors, the system may provide a virtual layout of the design area with recommended positions of design elements. In one example, the user may have several design elements that he/she wishes to incorporate into the design space. The user may capture images of these design elements and the system may recommend positioning the design elements in the space, based on the factors. In another example, the user may be shopping for a sofa at a local retail store. If the user is unsure about whether the sofa will fit into the design space the user may capture an image of the sofa. The system may then analyze the design element with respect to the design space and provide the user with a virtual image of the sofa in the design space. In this way, the user may visualize whether the sofa will fit in the desired location in the design space. The user may then select the indicator associated with that design element (the sofa) and purchase the element via his/her mobile device.

In some embodiments, the indicator associated with that specific design element may also provide other design elements suitable for that space. For example, if the user selects the indicator associated with the sofa, the system may provide other sofas with similar features that may also fit in that space. The system may also recommend other colored sofas based on the décor of the design space.

In some embodiments, the user may select, from the real-time video display, a design element within the design space. The user may then move the design element to other locations within the design space on the display, in order to get a visual of the possible positioning of that element within the design space. The system may then analyze the factors for the location in which the user moved the element to and determine if the design element will be suitable for the new, user defined position.

In yet other embodiments, the user may provide a design elements that he/she wants to have incorporated into the design space. The user may provide the design element by capturing an image of it, finding it on the Internet, at a retailer, and/or the like. The system may then position the design elements that the user provides in suitable positions within the design space. For example, a user may wish to add a painting to his/her living room. The system may position the painting on a wall in the living room that the system recommends based on the factors associated with the design space.

In another example, the user may be in a retail store and see a specific design element that he/she would really like to have in a design area. The user may use real-time video analysis, such as augmented reality or the like to capture information regarding the design element. The system may then provide the user with a display incorporating that design element into the user's design space. In this way, the user may visualize the design element in his/her space and determine if he/she wishes to purchase the design element.

Embodiments of the invention relate to systems, methods, and computer program products for providing interior design recommendations, comprising: receiving a captured an image of an interior area for the interior design from a user; building a directory of data relating to the interior area to design, wherein the directory comprises information regarding characteristics of the interior area to design; receiving information about products from a mobile device, wherein the products are to be incorporated in the interior area to design; identifying the products associated with the received information about products; matching the product with the directory of data relating to the interior area to design; and presenting the products and indicators associated with the products, via the mobile device of a user, over the captured image of the area to design, wherein the user may position the products within the captured image of the interior area to design.

In some embodiments, the directory further comprises information regarding the dimensions of the area, geographical location, and prior decorating information with respect to the user.

In some embodiments, receiving product information comprises manually inputted data, wherein the manually inputted data indicates user products preferences. Receiving product information may also comprise receiving real-time imaging of a product. The products may include furniture to be incorporated into the area and/or other items to be incorporated into the area. In some embodiments, presenting the products and indicators associated with the products comprises superimposing the products and indicators associated with the products over real-time video that is capture by the mobile phone of the area.

In some embodiments, identifying the products associated with the received information about products further comprises capturing a tag located on or proximate to the product and reading the tag to identify the product.

In some embodiments, presenting an indicator associated with the product comprises displaying the indicator on a display of the mobile device. The indicator associated with the product may further comprise superimposing the indicator over real-time video that is captured by the mobile device. The indicator is also selectable by the user. When the user selects the indicator the user receives an offer to purchase the product.

BRIEF DESCRIPTION OF THE DRAWINGS

Figure 1:
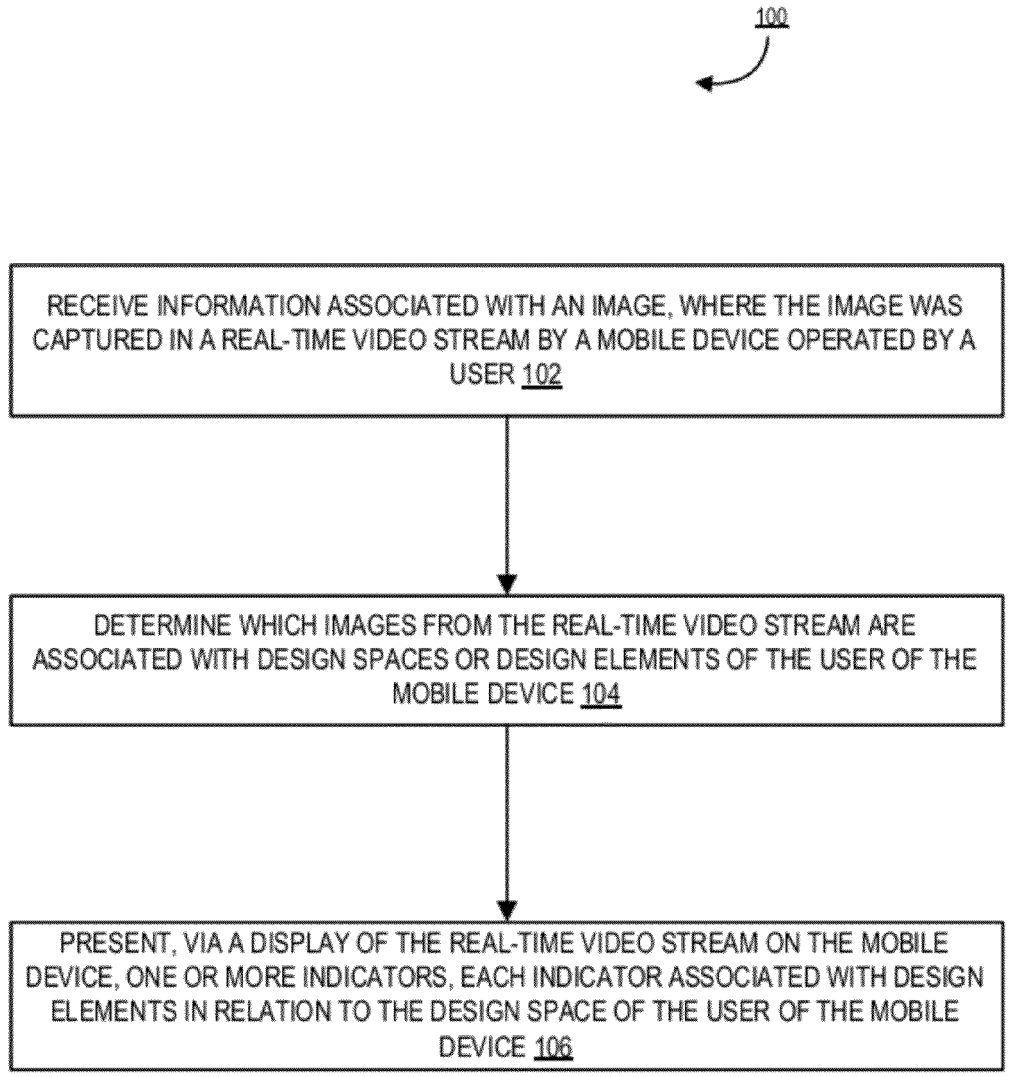
Figure 2:
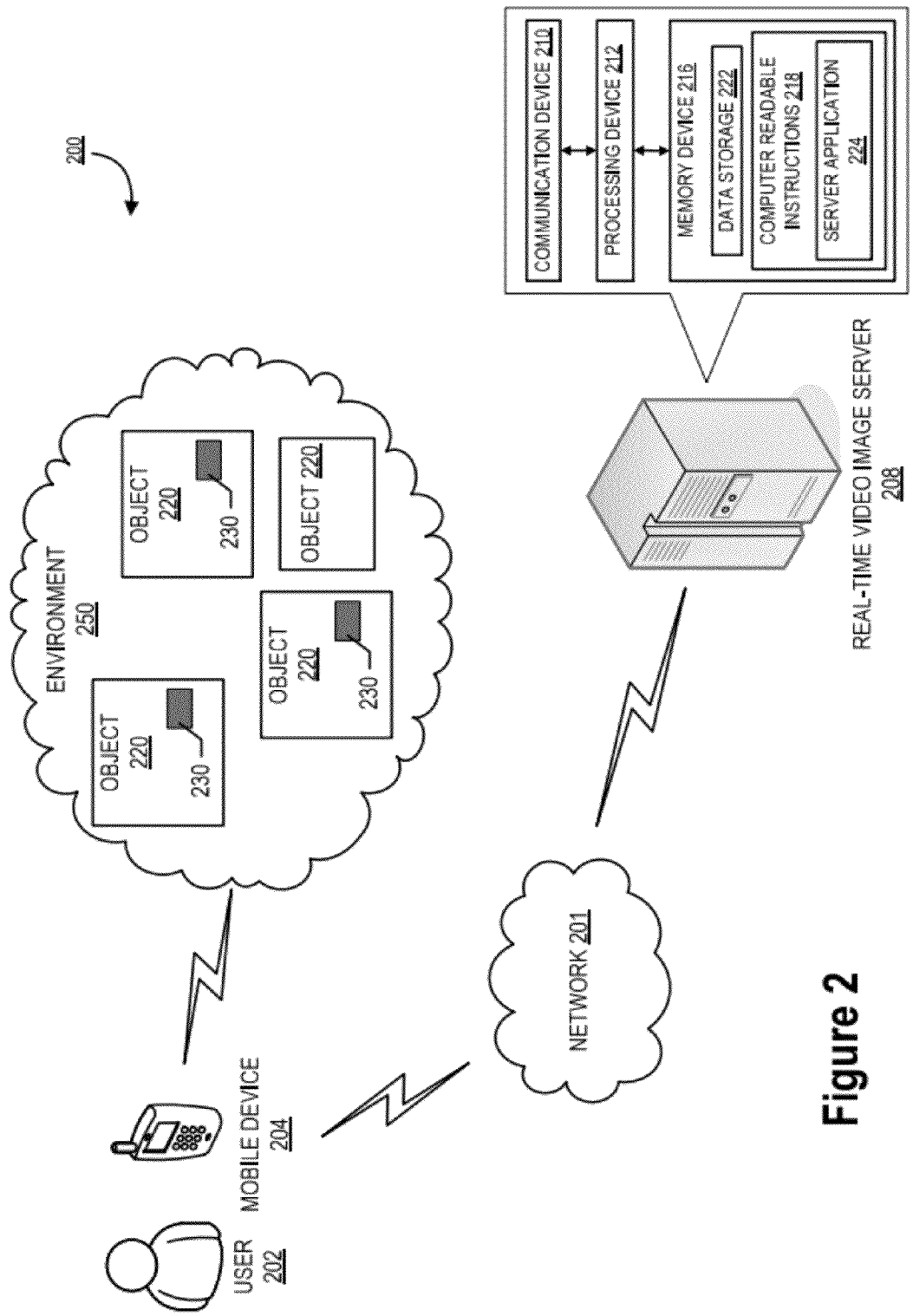
Figure 3:
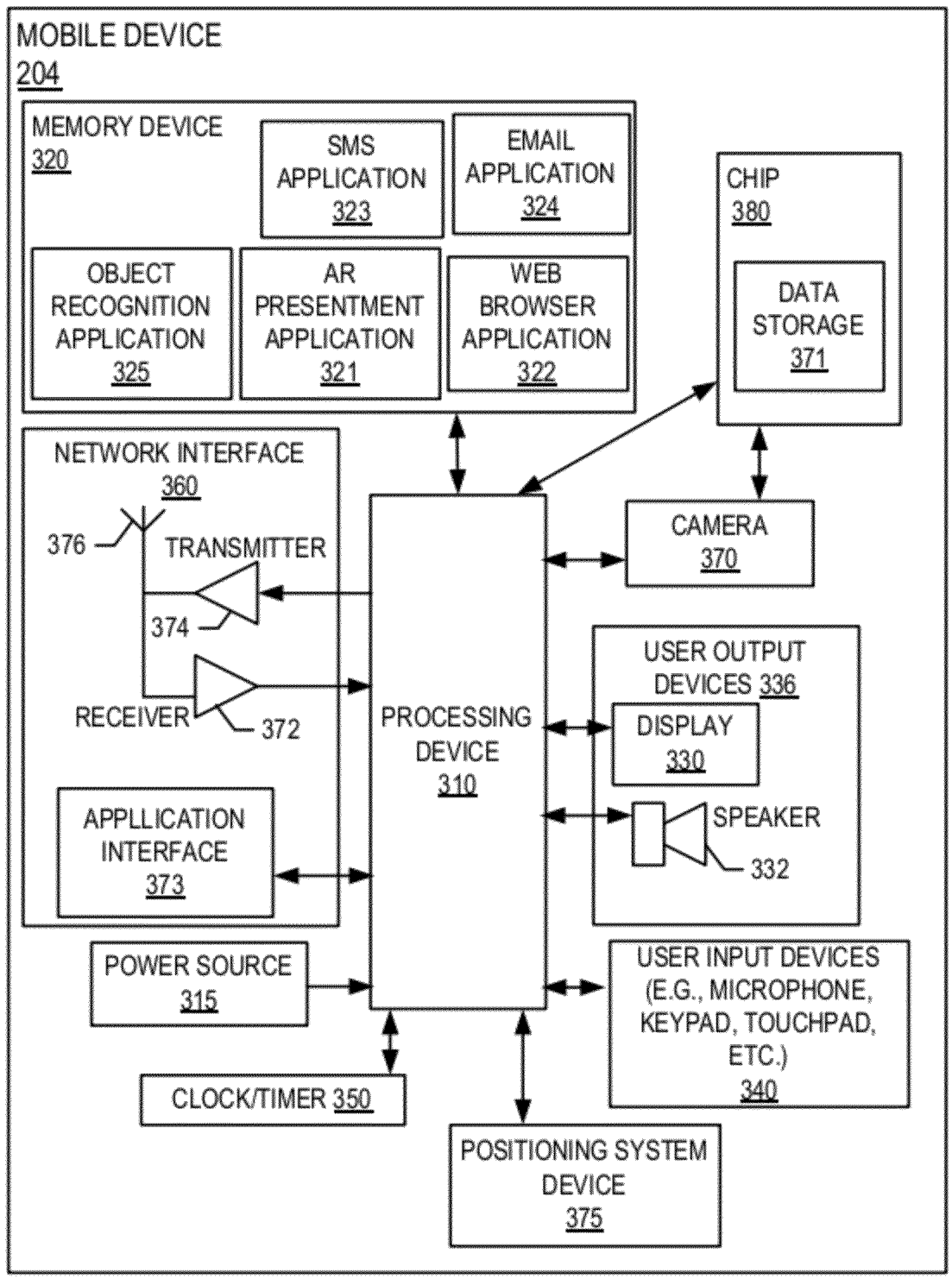
Figure 4:
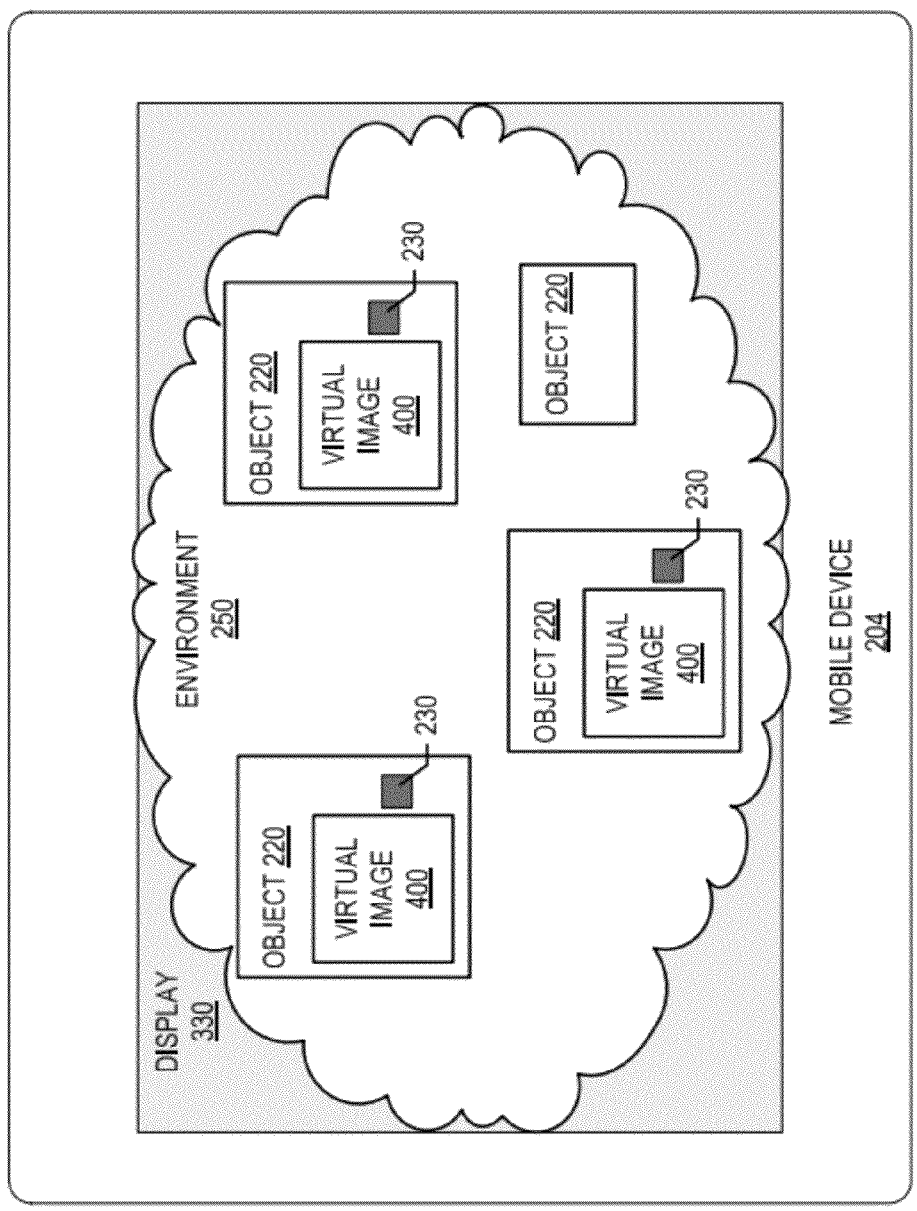
Figure 5:
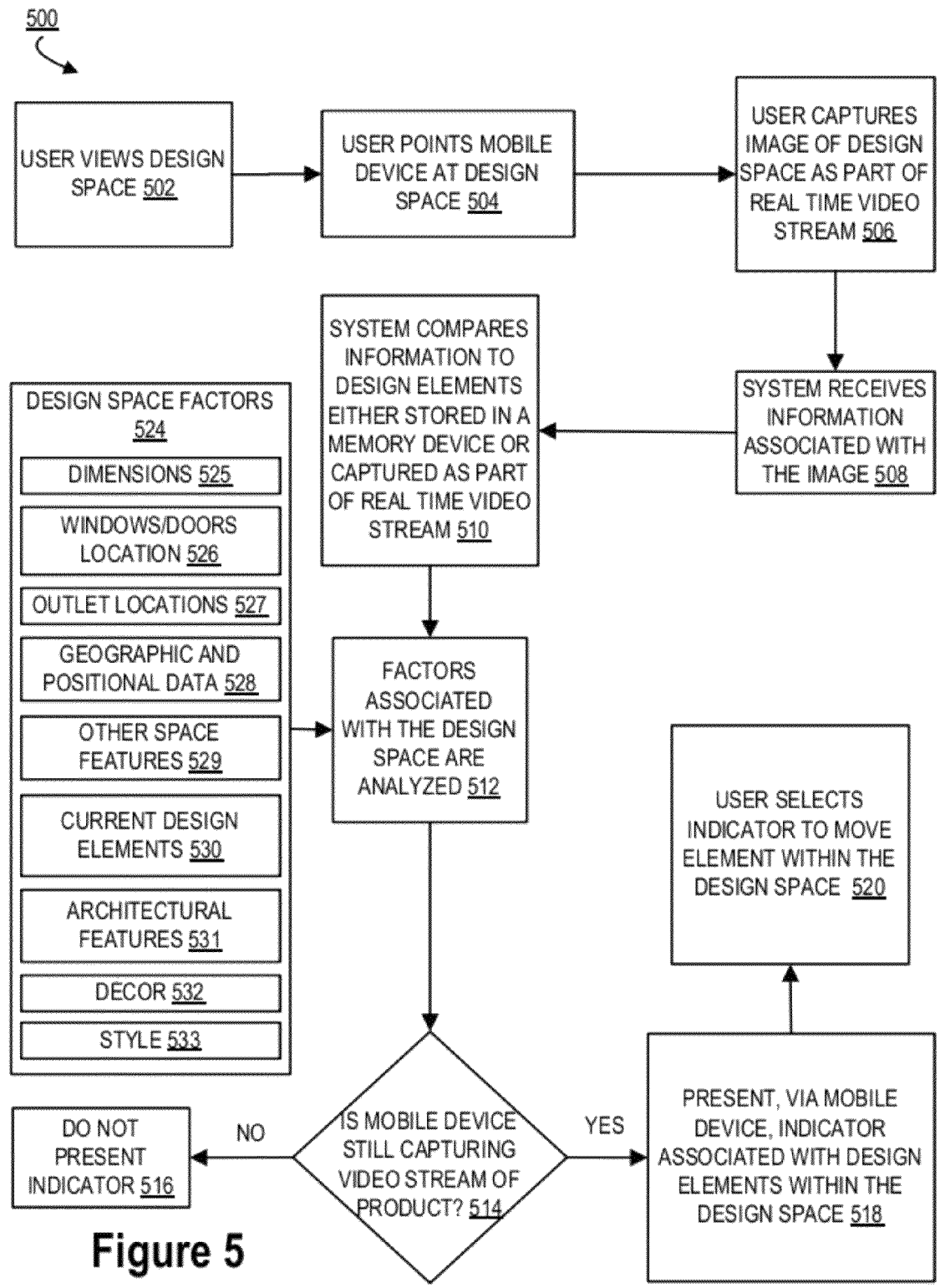
Figure 6:
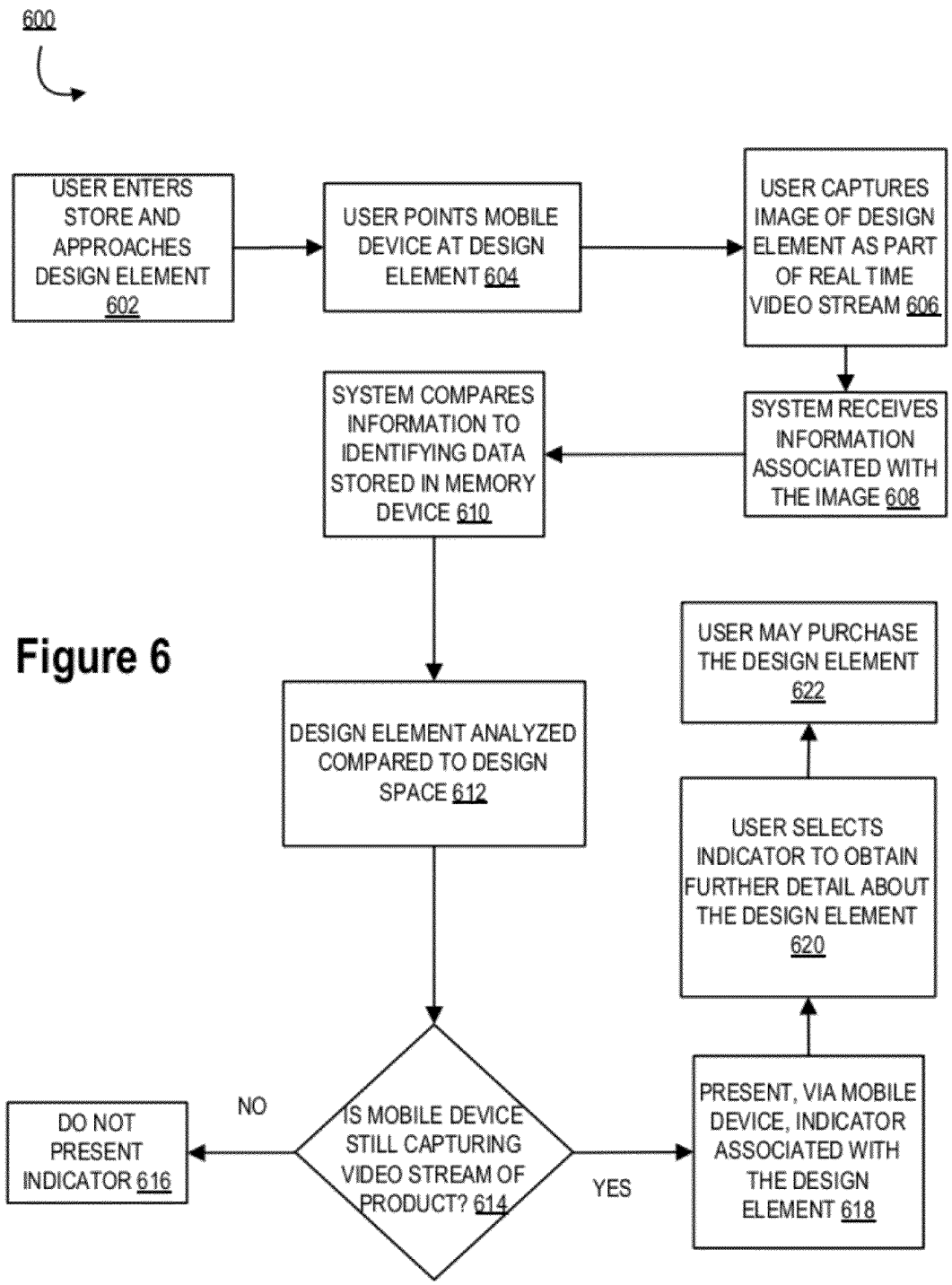
Figure 7:
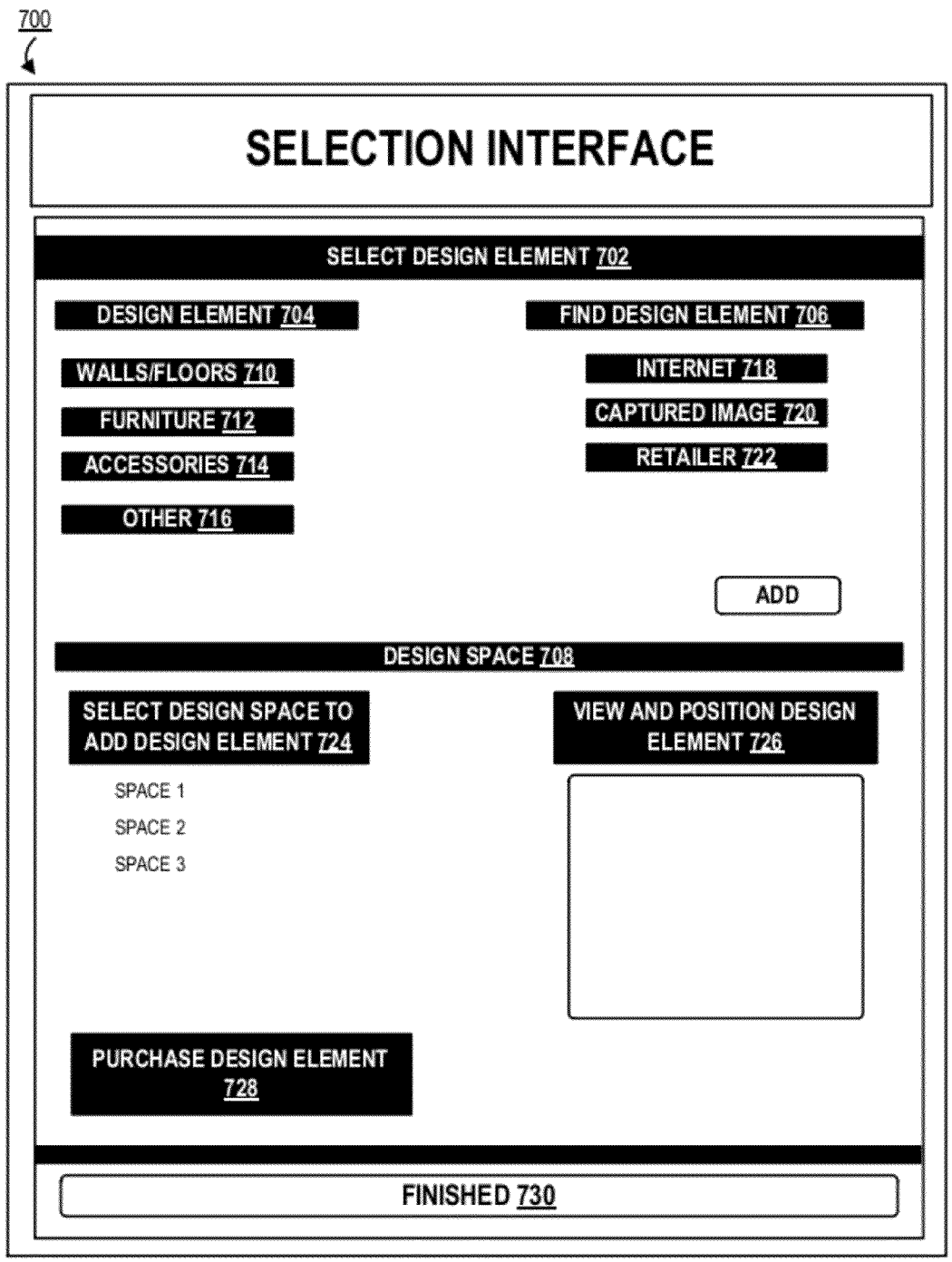

Having thus described embodiments of the invention in general terms, reference will now be made to the accompanying drawings, which are not necessarily drawn to scale, and wherein:

FIG. 1 provides a high level process flow illustrating a real-time interior design process, in accordance with one embodiment of the present invention;

FIG. 2 provides an interior design information system environment, in accordance with an embodiment of the invention;

FIG. 3 provides a block diagram illustrating a mobile device, in accordance with an embodiment of the invention;

FIG. 4 provides an a representation illustrating a mobile device real-time video stream display environment, in accordance with an embodiment of the invention;

FIG. 5 provides a process map for providing interior design information, in accordance with an embodiment of the invention;

FIG. 6 provides a process map for providing interior design information, in accordance with an embodiment of the invention; and FIG. 7 provides a design element selection interface, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to users.

While embodiments discussed herein are generally described with respect to "real-time video streams" or "real-time video" it will be appreciated that the video stream may be captured and stored for later viewing and analysis. Indeed, in some embodiments, video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

Some embodiments of the invention herein are generally described as involving "design spaces." Design spaces include any space; indoor or outdoor that a user may wish to decorate with furniture, flooring, paint, pictures, or other design elements. Design spaces typically include rooms in a house, rooms in an apartment, office space, hotel rooms, outdoor patios, mobile homes, and/or the like. Further, some embodiments of the invention herein are generally described as including "design elements." Design elements include any items that a user may wish to place in a design space. Design elements may include furniture, paint, flooring, entertainment items, pictures, tables, lamps, furniture, cooking items, vegetation, and/or the like.

FIG. 1 illustrates a high level process flow of a real-time interior design process 100, which will be discussed in further detail throughout this specification with respect to FIGS. 2 through 7. The first step in the process 100 is to receive information associated with an image, where the image was captured by a mobile device using real-time video stream, the mobile device operated by a user, as illustrated by block 102. A real-time video stream may include images of design elements or design spaces. For example, a user may move about his/her living room while capturing a real-time video stream of the environment including the dimensions, windows, doors, outlets, and current design elements in the living room. In another example, a user may be moving in an aisle of a store or shopping mall while capturing a real-time video stream of the environment including design elements, such as a sofa that the user may wish to incorporate into his/her design space.

Next, in block 104 a determination is made as to which images from the real-time video stream are associated with design spaces or design elements the user of a mobile device may visualize. The determination is made by analyzing the real-time video stream for objects, logos, dimensions, compass information, and/or other design space-indicating or design element-indicating features to determine what is within the video stream field and to then provide matches (e.g., associations) of design elements with design spaces based on several factors. These factors include the dimensions of the space, the location of windows within the space, the location of doors within the space, the location of outlets (electrical, communication, television, and the like) within the space, current design elements in the space (e.g., furniture, pictures, drapes, carpet, rugs, flooring (hardwoods, parquet, etc.), architectural features (columns, bay windows, etc.), etc.), décor (color schemes, design style, etc.) and/or other features found within the space. The style of the current room design may also be captured as a factor, such as contemporary, arts and crafts, classic, etc. Further, geographic and positional information may be of importance, as determined via GPS and/or compass of the mobile device capturing the image. The geographic location of the room may aid in determining design styles, types of fabrics, etc.

Thereafter, at block 106 one or more indicators are presented on the display of the mobile device in conjunction with the real-time video stream. In some embodiments, the indicators are presented when the user captures a design element or a design space. Each of the indicators is associated with an image determined to be a design element or a design space. The images associated with a design element are matched with the design space of the user of the mobile device, such that the design elements selected are specifically integrated into the users design space. For example, if a user selects a sofa from a retail store as the design element. The system will integrate it into the design space of the user. Furthermore, the system will determine, based on the factors of the design space, a recommended position for the sofa within the design area. The user may view the design area with the sofa in the location recommended by the system or the user may move it to different locations within the design area. The indicator may take various forms, such as display of a tag, a highlighted area, a hot-spot, or the like. In specific embodiments, the indicator is a selectable indicator, such that a user may select (e.g., click-on, hover-over, touch the display, provide a voice command, and/or the like) the design element or indicator to provide display of specifics related to the design element and offers for purchasing the element. In some embodiments, the specifics related to the design element may include other user's comments about the element, different colors, different sizes, and different shapes of the element. In addition, the information related to the design element or design space may include a review of the element or area by the system.

FIG. 2 provides an interior design information system environment 200, in accordance with one embodiment of the present invention. As illustrated in FIG. 2, the real-time video image server 208 is operatively coupled, via a network 201 to the mobile device 204. In this way, the real-time video image server 208 can send information to and receive information from the mobile device 204, to associate indicators within the real-time video stream to provide design element data and design element purchasing data to the user. FIG. 2 illustrates only one example of an embodiment of an interior design information system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual. The user 202 may a home owner, renter, or any other individual wishing to use real-time video analysis for interior design information. The user 202 may be in range of any design space or design element for which the user 202 may wish to consider implementing using the real-time video system. In some embodiments, the user 202 may purchase a design element via selecting the indicator associated with the element. The transaction for purchase of the design element may be made by the user 202 using the mobile device 204, such as a mobile wallet (e.g. smart phone, PDA, etc.) or other types of payment options, such as credit cards, checks, cash, debit cards, loans, lines of credit, virtual currency, etc. that allow the user 202 to make a transaction to purchase the design element.

As illustrated in FIG. 2, the real-time video image server 208 generally comprises a communication device 210, a processing device 212, and a memory device 216. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 212 is operatively coupled to the communication device 210 and the memory device 216. The processing device 212 uses the communication device 210 to communicate with the network 201 and other devices on the network 201, such as, but not limited to the mobile device 204. As such, the communication device 210 generally comprises a modem, server, or other device for communicating with other devices on the network 201.

In some embodiments, the processing device 212 may also be capable of operating one or more applications, such as one or more applications functioning as an artificial intelligence ("AI") engine. The processing device 212 may recognize design elements or design spaces that it has identified in prior uses by way of the AI engine. In this way, the processing device 212 may recognize specific design elements and/or classes of elements, and store information related to the recognized design element in one or more memories and/or databases discussed herein. Once the AI engine has thereby "learned" of a design element and/or class of elements, the AI engine may run concurrently with and/or collaborate with other modules or applications described herein to perform the various steps of the methods discussed. For example, in some embodiments, the AI engine recognizes a design element that has been recognized before and stored by the AI engine. The AI engine may then communicate to another application or module of the mobile device and/or server, an indication that the design element may be the same design element previously recognized. In this regard, the AI engine may provide a baseline or starting point from which to determine the nature of the design element. In other embodiments, the AI engine's recognition of a design element is accepted as the final recognition of the element.

As further illustrated in FIG. 2, the real-time video image server 208 comprises computer-readable instructions 218 stored in the memory device 216, which in one embodiment includes the computer-readable instructions 218 of a server application 224. In some embodiments, the memory device 216 includes data storage 222 for storing data related to design information including but not limited to data created and/or used by the server application 224 or a directory created by the user 202.

In the embodiment illustrated in FIG. 2 and described throughout much of this specification, the server application 224 may analyses design spaces captured by a user 202 using a real-time video stream. The server application 224 analyzes factors associated with the design space in order to predict a recommended location to place various design elements within the design space. The factors the server application 224 analyzes includes, but is not limited to the dimensions of the space, the location of windows within the space, the location of doors within the space, the location of outlets (electrical, communication, television, and the like) within the space, current design elements in the space (e.g., furniture, pictures, drapes, carpet, rugs, flooring (hardwoods, parquet, etc.), architectural features (columns, bay windows, etc.), etc.), décor (color schemes, design style, etc.) and/or other features found within the space. The style of the current room design may also be captured as a factor, such as contemporary, arts and crafts, classic, etc. Further, geographic and positional information may be of importance, as determined via the GPS and compass of the mobile device capturing the image. The geographic location of the room may aid in determining design styles, types of fabrics, etc.

Once the server application 224 analyzes the user's 202 design space, the server application 224 provides the user 202 a virtual design space incorporating proposed design elements based on the factors. For example, the user 202 may have captured his/her living room using the real-time image capture on his/her mobile device 204. The server application 224, after analyzing the factors associated with the living room, provides the user a virtual image of his/her living room that includes the design elements the user may have already in the living room or in a directory of elements to place into the living room. The server application 224 then recommends a location of the elements so that they fit into the space. The server application 224 may recommend several different variations of the design elements. In this way, the user 202 may visualize several different designs of the space and select the one the user likes. In other embodiments, the user 202 may move the design elements into different locations within the virtual design space. For example, the server application 224 may recommend a coffee table located in the center of the room. However, the user 202 may wish to remove the coffee table from the center of the room and add two end tables instead. If the user 202 wishes to do that, he/she is able to select, remove, move, and/or add different design elements within the virtual design area such that the user 202 may find a combination of design elements that are satisfactory to him. Furthermore, the virtual image of the design space provides the user 202 an ability to visualize a proposed interior design.

In some embodiments, the server application 224 may further provide access to a directory storing design elements or design spaces of a user 202. The server application 224 allows the user 202 to manually input, via a mobile device 204 or other device with similar processing features such as a computer, tablet, hand held device, etc., design elements that the user 202 wishes for the system to consider when adding design elements to a design space. The user 202 inputs may be added by the user 202 through the use of an interface, social networking site, and/or the like. In this way, the user 202 may provide user 202 inputs by several means, thus allowing for easy accessibility to update the user's design element requests. The data stored within the server application 224 provides computer readable instructions 218 to the processing device 212 to allow for selection of design elements and determining a recommended location for design elements. The server application 224 stores the user 202 inputted design element so that the server application 224 may incorporate the inputted design elements into a design space when appropriate.

In some embodiments, as described in further detail below, the server application 224 may recognize objects 220 within an environment 250. In other embodiments, the object recognition application 325 may recognize objects 220 within an environment. The object 230 may be interpreted with respect to data in the memory device 216 and be recognized as a possible design element that may be available to the user 202. In this way, the real-time video image server 208 provides object 230 interpretations and analysis with respect to the data on the real-time video image server 208.

Whether the design elements are already located in the design space or are manually inputted by the user 202, the user 202 may select the design element and move it within the design space. In this way, the user 202 may place the design elements where he/she wishes and view the design space with the design elements in various locations. When the user 202 moves the design element into a location within the design space an indicator may show the reasons the design element was not recommended for that location. For example, an electrical outlet may be covered up by the design element.

In some embodiments, the server application 224 may analyses design elements captured by a user 202 using a real-time video stream at a store or retailer. In other embodiments, the object recognition application 325 may analyze design elements capture by a user 202 using a real-time video stream at a store or retailer. The server application 224 analyzes the design elements the user 202 captures and stores the design elements in the memory device 216. The server application 224 may incorporate the design element into a design space, such that the user 202 may be able to visualize the design element in the design space. For example, the user 202 may be shopping at a retail store for a new refrigerator. The user 202 may be able to capture an image of the refrigerator and incorporate it into the design space, or kitchen, virtually. In this way, the user 202 may visualize whether the new refrigerator will fit in the space provided for the refrigerator in the kitchen. The server application 224 may determine that the design element, in this case the refrigerator, fits in the space provided for the element several ways. First, the server application 224 may use a form of visual scaling to determine the size of the design element. Visual scaling includes the server application 224 establishing pre-determined sizes for objects found within the captured image and visually scaling the size of the element based off of the size of the object. Second, the server application 224 may use user 202 inputted dimensions. These dimensions may be inputted by a user 202 or the user 202 may capture an image of the dimensions of the element. Third, the system may provide the server application 224 a database with dimensions of several design elements with the database, therefore the server application 224 may determine that the refrigerator is one of the design elements within the database and provide the user 202 with the dimensions.

The server application 224 may also provide an indicator to the user 202 associated with the design element. In other embodiments, the AR presentment application 321 may provide an indicator to the user 202 associated with the design element. The indicator may provide the user 202 with the ability to purchase the design element or indication as to other similar design elements. For example, if the refrigerator the user 202 selected in the retail store does not fit into the space provided in the kitchen, the server application 224 may provide, through the indicator, other similar refrigerators that may fit in the space. The indicator may also provide information about the design element. For example, the capacity, brand, energy use, etc. of the refrigerator.

The server application 224 may further provide the user 202 on the display of a mobile device, offers to purchase the design elements or similar design elements. Offers may be from several retailers of the design element, thus giving the user 202 options from whom to purchase. Offers to purchase may further include special offers in the form of a discount, coupon, etc. that may expire within a predetermined amount of time or may be available to the user at any time he/she wishes to make a transaction. If the user 202 selects to purchase the design element through the indicator 230 on the display of the mobile device, the server application 224 may communicably link with the user's 202 desired financial institution to authorize the transaction. In this way, the system may provide convenient purchasing of a design element that the user 202 wishes to include in his/her design space.

As further illustrated is FIG. 2, an environment 250 in which the user 202 utilizes a mobile device 204 to capture real-time video of an environment 250 in an augmented reality experience. As described in further detail below with respect to FIG. 3, the mobile device 204 may be any mobile communication device. The mobile device 204 has the capability of capturing real-time video of the surrounding environment 250. The real-time video capture may be by any means known in the art. In one particular embodiment, the mobile device 204 is a mobile telephone equipped with a camera capable of video capture.

The environment 250 contains a number of objects 220. Objects 220 include, but are not limited to a design element, design space, and/or the like that the user 202 may wish to utilize the system for. Some of such objects 220 may include a marker 230 identifiable to the mobile device 204. A marker 230 may be any type of marker that is a distinguishing feature that can be interpreted to identify specific objects 220. In some embodiments, the marker 230 may be interpreted by the mobile device 204. In other embodiments, the marker 230 may be interpreted by the real-time video image server 208. In yet other embodiments, the marker 230 may be interpreted by both the mobile device 204 and the real-time video image server 208. For instance, a marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 204 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object 220. For instance, the marker 230 may be some type of identifiable feature that is an indication that the object 220 is nearby. In some embodiments, the marker 230 for an object 220 may actually be the marker 230 for a different object 220. For example, the mobile device 204 may recognize a particular building as being "Building A." Data stored in the data storage 371 may indicate that "Building B" is located directly to the east and next to "Building A." Thus, marker 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 204 and/or the financial institution application 224 to interpret to a desired confidence level what the object is. For example, the mobile device 204, object recognition application 325 and/or AR presentation application 321 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be, or include, social network data, such as data retrieved or communicated from the Internet, such as tweets, blog posts, social networking site posts, various types of messages and/or the like. In other embodiments, the marker 230 is provided in addition to social network data as mentioned above. For example, mobile device 204 may capture a video stream and/or one or more still shots of a large gathering of people. In this example, as above, one or more people dressed as characters in costumes may be present at a specified location. The mobile device 204, object recognition application 325, and/or the AR presentation application 321 may identify several social network indicators, such as posts, blogs, tweets, messages, and/or the like indicating the presence of one or more of the characters at the specified location. In this way, the mobile device 204 and associated applications may communicate information regarding the social media communications to the user and/or use the information regarding the social media communications in conjunction with other methods of object recognition. For example, the mobile device 204 object recognition application 325, and/or the AR presentation application 321 performing recognition of the characters at the specified location may confirm that the characters being identified are in fact the correct characters based on the retrieved social media communications. This example may also be applied objects outside of people.

In some embodiments, the mobile device and/or server accesses one or more other servers, social media networks, applications, and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

In some embodiments, markers 230 may be recognized by the server application 224. In yet other embodiments, markers 203 may be recognized by the object recognition application 325 of the mobile device 204. For example, the server application 224 may identify a marker 230 as being a specific design element, the server application 224 may then provide real-time data indicating the proposed location for the design element within the design space of the user 202. For example, the marker 230 may identify the design element as a bookshelf. In this way, the server application 224 may provide an appropriate location within the user's 202 design space for the bookshelf, such as against a wall near a desk. In some embodiments, the server application 224 may provide an indicator of the other types of design elements that may be recommended in the design space. In other embodiments, the AR presentment application 321 of the mobile device 204 may provide an indicator of the other types of design elements that may be recommended in the design space. For example, with a design space including a bookshelf and a desk, server application 224 may also suggest lamps, calendars, a phone, or other design elements that may go into an office environment.

While FIG. 2 illustrates that the objects 220 with markers 230 only include a single marker 230, it will be appreciated that the object 220 may have any number of markers 230 with each equally capable of identifying the object 220. Similarly, multiple markers 230 may be identified by the mobile device 204 such that the combination of the markers 230 may be utilized to identify the object 220. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 204 may utilize GPS software to determine the location of the user 202. As noted above, a location-based marker 230 could be utilized in conjunction with other non-location-based markers 230 identifiable and recognized by the mobile device 204 to identify the object 220. However, in some embodiments, a location-based marker 230 may be the only marker 230. For instance, in such embodiments, the mobile device 204 may utilize GPS software to determine the location of the user 202 and a compass device or software to determine what direction the mobile device 204 is facing in order to identify the object 220. In still further embodiments, the mobile device 204 does not utilize any GPS data in the identification. In such embodiments, markers 230 utilized to identify the object 220 are not location-based.

FIG. 3 illustrates an embodiment of a mobile device 204 that may be configured to execute augmented reality functionality. A "mobile device" may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 204 may generally include a processing device 310 communicably coupled to such devices as a memory device 320, user output devices 336, user input devices 340, a network interface 360, a power source 315, a clock or other timer 350, a camera 370, a positioning system device 375, one or more chips 380, etc.

In some embodiments, the mobile device 204 and/or the server access one or more databases or datastores (not shown) to search for and/or retrieve information related to the object and/or marker. In some embodiments, the mobile device 204 and/or the server access one or more datastores local to the mobile device 204 and/or server and in other embodiments, the mobile device 204 and/or server access datastores remote to the mobile device and/or server. In some embodiments, the mobile device 204 and/or server access both a memory and/or a datastore local to the mobile device 204 and/or server as well as a datastore remote from the mobile device 204 and/or server.

The processing device 310 may include functionality to operate one or more software programs or applications, which may be stored in the memory device 320. For example, the processing device 310 may be capable of operating a connectivity program, such as a web browser application 322. The web browser application 322 may then allow the mobile device 204 to transmit and receive web content, such as, for example, location-based content and/or other web page content, according to a Wireless Application Protocol (WAP), Hypertext Transfer Protocol (HTTP), and/or the like.

The processing device 310 may also be capable of operating applications, such as an object recognition application 325 and/or an AR presentment application 321. The object recognition application 325 and/or the AR presentment application 321 may be downloaded from a server and stored in the memory device 320 of the mobile device 204. Alternatively, the object recognition application 325 and/or the AR presentment application 321 may be pre-installed and stored in a memory in the chip 380. In such an embodiment, the user may not need to download the object recognition application 325 and/or the AR presentment application 321 from a server. In this way the object recognition application 325 and/or the AR presentment application 321 may remain at the server, such as the real-time video image server 208, within the server application 224.

The object recognition application 325 provides the mobile device 204 with object recognition capabilities. In this way, objects 220 such as products and/or the like may be recognized by the object 220 itself and/or markers 230 associated with the objects 220. This is described in further detail below with respect to FIG. 4. In this way the object recognition application 325 may communicate with other devices on the network 201 to determine the object 220 within the real-time video stream.

The AR presentment application 321 provides the mobile device 204 with AR capabilities. In this way, the AR presentment application 321 may provide superimposed indicators related to the object 220 in the real-time video stream, such that the user 202 may have access to the targeted offers by selecting an indicator superimposed on the real-time video stream. The AR presentment application 321 may communicate with the other devices on the network 201 to provide the user 202 with indications associated with targeted offers for objects 202 in the real-time video display. The presentation and selection of indicators provided to the user 202 via the AR presentment application 321 is described in further detail below with respect to FIG. 5.

The chip 380 may include the necessary circuitry to provide both the object recognition and/or the AR functionality to the mobile device 204. Generally, the chip 380 will include data storage 371 which may include data associated with the objects within a real-time video stream that the object recognition application 325 identifies as having a certain marker(s) 230. The chip 380 and/or data storage 371 may be an integrated circuit, a microprocessor, a system-on-a-chip, a microcontroller, or the like. As discussed above, in one embodiment, the chip 380 may provide both the object recognition and the AR functionality to the mobile device 204.

Of note, while FIG. 3 illustrates the chip 380 as a separate and distinct element within the mobile device 204, it will be apparent to those skilled in the art that the chip 380 functionality may be incorporated within other elements in the mobile device 204. For instance, the functionality of the chip 380 may be incorporated within the memory device 320 and/or the processing device 310. In a particular embodiment, the functionality of the chip 380 is incorporated in an element within the mobile device 204 that provides object recognition and AR capabilities to the mobile device 204. Still further, the chip 380 functionality may be included in a removable storage device such as an SD card or the like.

The processing device 310 may be configured to use the network interface 360 to communicate with one or more other devices on a network 201 such as, but not limited to the real-time video image server 208. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the mobile device 204 may be configured to operate with one or more air interface standards, communication protocols, modulation types, and access types. By way of illustration, the mobile device 204 may be configured to operate in accordance with any of a number of first, second, third, and/or fourth-generation communication protocols and/or the like. For example, the mobile device 204 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 204 may also be configured to operate in accordance with non-cellular communication mechanisms, such as via a wireless local area network (WLAN) or other communication/data networks.

The network interface 360 may also include an application interface 373 in order to allow a user to execute some or all of the above-described processes with respect to the object recognition application 325, the AR presentment application 321 and/or the chip 380. In some embodiments, the application interface 373 may further execute some or all of the above-described processes with respect to the server application 224. The application interface 373 may have access to the hardware, e.g., the transceiver, and software previously described with respect to the network interface 360. Furthermore, the application interface 373 may have the ability to connect to and communicate with an external data storage on a separate system within the network 201. In some embodiments, the external data is stored in the memory device 216 of the real-time video image server 208.

As described above, the mobile device 204 may have a user interface that includes user output devices 336 and/or user input devices 340. The user output devices 336 may include a display 330 (e.g., a liquid crystal display (LCD) or the like) and a speaker 332 or other audio device, which are operatively coupled to the processing device 310. The user input devices 340, which may allow the mobile device 204 to receive data from a user 202, may include any of a number of devices allowing the mobile device 204 to receive data from a user 202, such as a keypad, keyboard, touch-screen, touchpad, microphone, mouse, joystick, other pointer device, button, soft key, and/or other input device(s).

The mobile device 204 may further include a power source 315. Generally, the power source 315 is a device that supplies electrical energy to an electrical load. In some embodiment, power source 315 may convert a form of energy such as solar energy, chemical energy, mechanical energy, etc. to electrical energy. Generally, the power source 315 in a mobile device 204 may be a battery, such as a lithium battery, a nickel-metal hydride battery, or the like, that is used for powering various circuits (e.g., the transceiver circuit, and other devices that are used to operate the mobile device 204). Alternatively, the power source 315 may be a power adapter that can connect a power supply from a power outlet to the mobile device 204. In such embodiments, a power adapter may be classified as a power source "in" the mobile device 204.

The mobile device 204 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory, or the like.

The memory device 320 may store any of a number of applications or programs which comprise computer-executable instructions/code executed by the processing device 310 to implement the functions of the mobile device 204 described herein. For example, the memory device 320 may include such applications as an object recognition application 325, an AR presentment application 321, a web browser application 322, an SMS application 323, an email application 324, etc.

FIG. 4 further illustrates a mobile device 204 wherein the user 202 has executed an object recognition application 325, an AR presentment application 321, and a real-time video capture device (e.g., camera 370) is utilized to display the surrounding environment 250 on the display 330 of the mobile device 204. In some embodiments, the object recognition application 325 is configured to utilize markers 230 to identify objects 220, such as design elements or design spaces, and indicate to the user 202 identified objects 220 by displaying a virtual image 400 on the mobile device display 330. As illustrated in FIG. 4, if an object 220 does not have any markers 230 (or at least enough markers 230 to yield object identification), the object 220 will be displayed without an associated virtual image 400.

The object recognition application 325 may use any type of means in order to identify desired objects 220. For instance, object recognition application 325 may utilize one or more pattern recognition algorithms to analyze objects in the environment 250 and compare with markers 230 in data storage 371 which may be contained within the mobile device 204 (such as within chip 380) or externally on a separate system accessible via the connected network 201, such as but not limited to the real-time video image server 208. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the mobile device 204 is configured to superimpose a virtual image 400 on the mobile device display 330 utilizing the AR presentment application 321. The virtual image 400 is generally a tab or link displayed such that the user 202 may "select" the virtual image 400 and retrieve information related to the identified object. The information may include any desired information associated with the selected object and may range from basic information to greatly detailed information. In some embodiments, the virtual image 400 may provide the user 202 with an internet hyperlink to further information on the object 220. The information may include, for example, all types of media, such as text, images, clipart, video clips, movies, or any other type of information desired. In yet other embodiments, the virtual image 400 information related to the identified object may be visualized by the user 204 without "selecting" the virtual image 400.

In embodiments in which the virtual image 400 provides an interactive tab to the user 202, the user 202 may select the virtual image 400 by any conventional means for interaction with the mobile device 204 via the AR presentment application 321. For instance, in some embodiments, the user 202 may utilize an input device 340 such as a keyboard to highlight and select the virtual image 400 in order to retrieve the information. In a particular embodiment, the mobile device display 330 includes a touch screen that the user may employ to select the virtual image 400 utilizing the user's finger, a stylus, or the like.

In some embodiments, the virtual image 400 is not interactive and simply provides information to the user 202 by superimposing the virtual image 400 onto the display 330. For example, in some instances it may be beneficial for the object recognition application 325 and/or the AR presentment application 321 to merely identify an object 220, just identify the object's name/title, give brief information about the object, etc., rather than provide extensive detail that requires interaction with the virtual image 400. The mobile device 204 is capable of being tailored to a user's desired preferences.

Furthermore, the virtual image 400 may be displayed at any size on the mobile device display 330. The virtual image 400 may be small enough that it is positioned on or next to the object 220 being identified such that the object 220 remains discernable behind the virtual image 400. Additionally, the virtual image 400 may be semi-transparent such that the object 220 remains discernable behind the virtual image. In other embodiments, the virtual image 400 may be large enough to completely cover the object 220 portrayed on the display 330. Indeed, in some embodiments, the virtual image 400 may cover a majority or the entirety of the mobile device display 330.

The user 202 may opt to execute the object recognition application 325 and/or the AR presentment application 321 at any desired moment and begin video capture and analysis. However, in some embodiments, the object recognition application 325 and/or the AR presentment application 321 includes an "always on" feature in which the mobile device 204 is continuously capturing video and analyzing the objects 220 within the video stream. In such embodiments, the object recognition application 325 may be configured to alert the user 202 that a particular object 220 has been identified. The user 202 may set any number of user preferences to tailor the AR experience to his/her needs. For instance, the user 202 may opt to only be alerted if a certain particular object 220 is identified. Additionally, it will be appreciated that the "always on" feature in which video is continuously captured may consume the mobile device power source 315 more quickly. Thus, in some embodiments, the "always on" feature may disengage if a determined event occurs such as low power source 315, low levels of light for an extended period of time (e.g., such as if the mobile device 204 is in a user's pocket obstructing a clear view of the environment 250 from the mobile device 204), if the mobile device 204 remains stationary (thus receiving the same video stream) for an extended period of time, the user 202 sets a certain time of day to disengage, etc. Conversely, if the "always on" feature is disengaged due to the occurrence of such an event, the user 202 may opt for the "always on" feature to re-engage after the duration of the disengaging event (e.g., power source 315 is re-charged, light levels are increased, etc.).

In some embodiments, the user 202 may identify objects 220 that the object recognition application 325 does not identify and add it to the data storage 371 with desired information in order to be identified and/or displayed in the future. For instance, the user 202 may select an unidentified object 220 and enter a name/title and/or any other desired information for the unidentified object 220. In such embodiments, the object recognition application 325 may detect/record certain markers 230 about the object so that the pattern recognition algorithm(s) (or other identification means) may detect the object 220 in the future. Furthermore, in cases where the object information is within the data storage 371, but the object recognition application 325 fails to identify the object 220 (e.g., one or more identifying characteristics or markers 230 of the object has changed since it was added to the data storage 371 or the Marker 230 simply was not identified), the user 202 may select the object 220 and associate it with an object 220 already stored in the data storage 371. In such cases, the object recognition application 325 may be capable of updating the markers 230 for the object 220 in order to identify the object in future real-time video streams.

In addition, in some embodiments, the user 202 may opt to edit the information or add to the information provided by the virtual object 400, provided via the AR presentment application 321. For instance, the user 202 may opt to include user-specific information about a certain object 220 such that the information may be displayed upon a future identification of the object 220. Conversely, in some embodiments, the user 202 may opt to delete or hide an object 220 from being identified and a virtual object 400 associated therewith being displayed on the mobile device display 330.

Furthermore, in some instances, an object 220 may include one or more markers 230 identified by the object recognition application 325 that leads the object recognition application 325 to associate an object with more than one object in the data storage 371. In such instances, the user 202 may be presented with the multiple candidate identifications and may opt to choose the appropriate identification or input a different identification. The multiple candidates may be presented to the user 202 by any means. For instance, in one embodiment, the candidates are presented to the user 202 as a list wherein the "strongest" candidate is listed first based on reliability of the identification. Upon input by the user 202 identifying the object 220, the object recognition application 325 may "learn" from the input and store additional markers 230 in order to avoid multiple identification candidates for the same object 220 in future identifications.

Additionally, the object recognition application 325 may utilize other bases for identification than identification algorithms. For instance, the object recognition application 325 may utilize the user's 202 location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 202 may input preferences or other metrics for which the object recognition application 325 may utilize to narrow results of identified objects 220.

In some embodiments, the AR presentment application 321 may have the ability to gather and report user 202 interactions with displayed virtual objects 400. The data elements gathered and reported may include, but are not limited to, design elements and design spaces. Such user 202 interactions may be reported to any type of entity desired.

In some embodiments, the information provided by the real-time video stream may be compared to data provided to the system through an API. In this way, the data may be stored in a separate application and be implemented by request from the mobile device and/or server.

FIG. 5 illustrates a process map for providing interior design information using a real-time video stream 500. One of ordinary skill in the art will recognize that some steps of the process 500 may be performed by the real-time video server 208, utilizing the server application 224 and/or the mobile device 204, utilizing the object recognition application 325 and the AR presentment application 321. In this way, the steps of the process 500 may be performed by several devices of the system, independently and/or in conjunction with each other.

At block 502 the user 202 views a design space. In this way, the user 202 may capture real-time images of the design space he/she wishes to add furniture, paint, flooring, or design. In some embodiments, the user 202 may capture real-time images of design spaces that he/she wishes to incorporate into his/her design space. Once the user 202 enters the design space or passes by a design space that the user 202 likes, the user 202 may point his/her mobile device at the design space, as shown in block 504. In some embodiments, the design space may also include design elements.

At block 506 the user 202 may capture images of design spaces and/or design elements, as part of a real-time video stream. In some embodiments, the user 202 may point his/her mobile device 204 at a design space, such as a living room, bedroom, patio, kitchen, etc. In other embodiments, the user 202 may point his/her mobile device 204 at a design element, such as furniture, pictures, paint samples, flooring, etc. Once the user 202 has captured images, the system may receive information associated with the image 508. The image may be a single frame of video (e.g., a screenshot), an entirety of a video, or any portion in between. Additionally, rather than video, the user 202 may opt to take a still picture of the environment. The image may further comprise of multiple single images compiled together.

Once the server application 224 or mobile device 204 receives the information associated with the image, a comparison of the information from the image to identifying data, or a directory, stored in the memory device is performed, as illustrated in block 510. The directory may first determine the landscape element or landscape area in the image, from the information sent to the system. For example, if the user 202 is using real-time video stream to identify his/her living room, the data from the image the user 202 took may provide data to the server application 224 or the mobile device 204 such that the factors associated with the design space 524 that have been previously analyzed may be known. Second, the directory may include a database of information for design elements and design styles. The information for design elements includes data about each design element as it pertains to the factors for the design space 524. Therefore once the system determines the design element in the image or manually inputted by the user 202, the directory may compare the factors of the user's 202 design space to the data of that particular design element to determine a score for that design element. The score of the design element provides an indication on how close of a match the design element is in relation to the design space, based on the factors. In this way the system may score each element to determine which element may be best situated for the user's 202 design space. The database for design styles functions similar to the database for design elements. In this way, the system may determine a score for how closely the design element matches the design style of the user 202.

At block 512 factors are analyzed with respect to a design space to provide recommended design elements for the design space. The recommended design elements are presented in the design space virtually on the mobile device 204 of the user 202. In this way, the user 202 may virtually view his/her design space with design elements positioned in the space. Furthermore, the system provides the user 202 tools to be able to move the design elements within the design space. In this way, the user 202 may visualize different design possibilities for the space. Determining a recommended location for a design element within the design space depends on the design element properties and how those properties coincide with the design space. To determine if the properties of the design element is appropriate for a design space, design space factors 524 are analyzed. Design space factors allow the system to recommend a position for design elements. For example, a large piece of furniture may only fit into a space if it is positioned a specific way. Therefore, if the user 202 wishes to have that piece of furniture in the space, the design space factors recognize that the piece of furniture will only fit if positioned the specific way. Furthermore, the design space factors may realize that a large design element may not even fit into the space. For example, if the only entry into the space is through a small door way, the design factors analyze this to determine if a large design element may even fit through the door way.

Design space factors 524 include dimensions 525, window and door locations 526, outlet locations 527, geographic and positional data 528, other space features 529, current design elements 530, architectural features 531, and décor 532. Dimensions 525 including the length, width, and height of the design space. This also takes into about variations in the walls, such as bulk heads and the like. Furthermore, dimensional data takes into account accessories built into the space. These accessories may include sinks, toilets, built-in bookshelves, counter tops, and the like. For example, if the user 202 wishes to put a design element such as an oven, into a space in a built in cabinet in the user's 202 kitchen, the system may determine the exact dimensions of the space for the oven, such that the user 202 may go to a store and be confident that the oven he/she wishes to purchase will fit in the space provided. Dimensional data provides the system an indication of the type of design space the user 202 is designing. For example, if the system recognizes a toilet and a sink, the system will recommend design elements that are associated with bathroom décor. Dimensional data 525 further provides the system with an indication as to what is behind the walls, such as plumbing, electrical, and the like. In this way, the dimensional data 525 may provide an indication as to where not to drill or cut into walls or floors. Furthermore, dimensional data 525 may provide an indication of load bearing and non-load bearing walls. In this way, a contractor, designer, or user 202 may know what walls may be relocated without effecting a load bearing wall. Finally, dimensional data 525 provides the system an indication as to what size design elements may be utilized in the space.

Window and door locations 526 includes determining the positioning and size of each window and door in the design space. Determining the location of windows and doors aids the system in determining the positioning of design elements. For example, the system will make sure to position larger design elements like bookshelves or sofas away from doors and windows so these design elements do not block the doors or windows. Furthermore, determining the location of doors and windows may determine the type of design area the user 202 is designing. For example, if there is one door and several windows, wherein the view from the windows is elevated, the system may recognize that the user 202 is designing an upstairs room, such as a bedroom. The system may take this into account and recommend lighter weight or less bulky design elements so that carrying the design elements up stairs is not as challenging. The system may also recognize the size of the windows and doors. In this way, the system may recognize that only a limited number of design elements may fit into the room (through the door).

The system also analyzes the outlet locations 527 in the design space. Outlets may be electrical outlets, communication outlets, television or cable outlets, location of speaker wires, switches, lights, and/or the like. In this way, the system may recognize outlets and recommend a position for design elements based on the position of outlets. For example, if only one wall in a living room has a television outlet, the system may recognize this and position a television on that wall. In another example, if the user 202 is designing an office space, the system may recognize the positions of the outlets so that a desk with a computer is located near communication and electrical outlets. In some embodiments, the system recognized lighting, such that the ambient lighting in the design space is mimic in the virtual environment. In this way, the user 202 may view paint colors and the like to determine how the color looks in the space. The system may also allow for input of different lighting into the area and show the amount of light that the new lighting fixtures may provide to the room. The selected lighting may be based on the function for the room, the location of the room, and/or other factors.

Geographic and positional data 528 provide location and directional basis for the design space to the system. Geographic and positional data 528 are determined by GPS and compass features of the mobile device. The geographic location of the space may aid in determining design styles, types of fabrics, etc. For example, a space located near a beach may be more apt for cottage or beach designs. A space located in a geographic area in cold climes may be more apt for design elements imbuing a sense of warmth. Furthermore, geographic location data may provide the system with recommendations for installing air conditioning units, heat pumps, etc. In this way, depending on the location of the design space, the user 202 may be informed of the most appropriate air conditioner for his/her space. Compass direction of the mobile device capturing the photo or image may be an aid in determining which direction the windows in the space face for indications of lighting, shading, and heat exposure to decorative elements. In this way, the system may recognize the location of the user's 202 design space and better predict the design elements the user 202 may wish to incorporate into his/her design space.

Other design space features 529 allow the system to recognize current and past decorating styles available. Each individual user 202 has a different design style. Some users 202 may prefer decorating in a western theme while other users 202 may prefer a more modern décor. In this way, the system may recognize different styles of the user 202 or styles that the user 202 may wish to incorporate into the design space when selecting recommended design elements and locations for those elements. Other design space features 529 allows the system to recognize the unique styles of the user 202 by including the style captured in the design space as well as recalling prior design spaces the user 202 has decorated. This also includes recognition of the design elements that the user 202 has purchased in the past. For example, if a user 202 has purchased stainless steel appliances in the past, the system may recognize and suggest a stainless steel oven when the user 202 is wishing to purchase a new oven. In this way, the more the user 202 uses the system for designing spaces, the more the system retains and learns about the user 202 and the user's 202 "likes" with respect to décor. Therefore, the next time the user 202 uses the system for designing a space, the system may incorporate prior design styles of the user 202 when recommending design elements.

Current design elements 530 include design elements that are already in the design space. These elements may be pictures, furniture, drapes, carpet, rugs, flooring, etc. The current design elements 530 provide the system with an indication as to the style the user 202 typically "likes," thus the system may be able to match design elements with the current design element in the space.

Architectural features 531 such as columns, bay windows, unique woodwork, etc. provide the system with an indication as to the style of the design space, such as if the space is colonial, craftsman style, Mediterranean, or the like. Architectural features 531 may allow the system to predict design elements that may cooperate with the overall style of the design space.

Décor 532, such as color schemes, patterns, etc. or style 533 such as contemporary, arts and crafts, colonial, craftsman, Mediterranean, classic, etc. provide further indication to the system as to the type of design elements that the user 202 may wish to continue to have within the design space. Décor 532 may also include designers, television shows, or the like that the user 202 may wish to incorporate ideas or styles from. Furthermore, the system may provide the user 202 information on interior designers that may be able to help the user 202. The system may match the interior designer's style with the style of the user 202. Décor 532 may also all for the system to select and recommend artwork or artists for the design space that the user 202 may like based on his/her current décor.

The user 202 or user's family may also be considered for in the factors analyzed. The user 202 or user's family may require specific design elements to accommodate for elderly, handicapped, or children living within the user's 202 space. For example the user 202 may be an elderly person needing wheel chair ramps, bathroom handles, etc. for easier access. Therefore the design space may be directed to the needs of the user 202.

As further detailed in FIG. 5, once the factors are analyzed for providing a recommended location for design element within a design space in block 512, in decision block 514, a determination is made as to whether the mobile device is still capturing video stream of the design space or design elements. If no video stream is being captured then no indicator is presented in block 516. If a video stream is still being captured, then in block 518 indicators are continuing to be presented with respect to the design elements within the design space. The indicators are associated with a design element the user 202 may visualize in a virtual design space environment. In some embodiments, the user 202 may select the indicator. The selected indicator may allow the user 202 to move and subsequently position the element in other locations within the design space. In yet other embodiments, the user 202 may obtain further detail about the location recommended for the design element by selecting the indicator. For example, the user 202 may select an indicator associated with a television. The system may then inform the user 202 that the reason for recommending that location for the television was because of outlets, specifically television outlets.

If the user 202 selects the indicator in block 520, the user 202 may also have the option of moving the design element within the virtual design space. In this way, the user 202 may view the design element in different positions within the design space so that he/she may make a determination of where he/she likes the design element positioned. The system may also provide an indication of perceived problems with moving the design element to that location. For example, if a user 202 moves a chair from the recommended location to the corner of the room, the system may indicate to the user 202 that the chair may not be able to fully recline or swivel if it is positioned in the corner.

FIG. 6 illustrates a process map for providing interior design information using a real-time video stream 600. At block 602 the user 202 enters a store and approaches a design element. The design element may be viewed when a user 202 enters a retailer or a business and approaches a design element. The user 202 may then point his/her mobile device at the design element in the retail store or business, as shown in block 604.

At block 606 the user 202 may capture images of the design elements in a retail store or business, as part of a real-time video stream. In some embodiments, the user 202 may point his/her mobile device at a design element, such as a sofa, chair, television, table, picture, lamp, flooring, paint color, etc. These design elements may in a retail store, a business, on television, on the internet, or the like. Similar to above with respect to FIG. 5, once the user 202 has captured the images, the system may receive the information associated with the image 608. Once the server application 224 or mobile device 204 receives the information associated with the image, a comparison of the information from the image to identifying data stored in the memory device is performed, as illustrated in block 610. The directory may determine the design element in the image. If the system has recognized the design element previously, it is stored in the memory device. As such, if the design element is captured again, data associated with the element will be easily obtained by accessing the directory. The directory may also include manually inputted information regarding design elements. Therefore, if the user 202 has inputted the design element into the system via an interface or the like, the system will recognize the design element. In some embodiments, the system may determine the design element without accessing the directory. The system may determine the size and shape of the design element without accessing the directory. Furthermore, the system may be able to reach out to outside sources to determine details associated with the design element.

Manual inputs may be provided by the user 202 through the use of an interface, social networking site, by other selection methods which may include, but are not limited to sending a communication via email, text, voice message, video message/conference, or like means of selecting an opt-in function. The user 202 may opt-in to using an interface, such as a selection interface 700, such as illustrated in FIG. 7.

FIG. 7 illustrates a design element selection interface 700 in accordance with some embodiments of the invention. If the user 202 has opted-in for manual input of design elements, the user 202 may provide the design elements to the directory. In one embodiment, manually inputted design elements may be provided to the directory by the user 202 through the user of an interface, such as the design element selection interface 700.

The design selection interface 700 may be provided to the mobile device of the user by the server application 224. The user 202 may access the interface in any means he/she would typically access the system or the Internet. FIG. 7 provides one embodiment of a selection interface that allows a user 202 to opt-in to provide manually inputted design elements for consideration within the user's 202 design space. The real-time video image server 208 receives a request from a user 202 to manually input design elements.

The user 202 may provide design elements he/she wishes to consider in his/her design space within the select design element section 702. In the select design element section 702 the user 202 may find design elements that he/she wishes to incorporate into his/her design space. In the design element section 704, the user 202 may search for design elements within a category of design elements listed. The design element categories include wall and floor treatments 710, furniture 712, accessories 714, and other 716.

If the user 202 is searching for a design element, the user 202 may select a category from which to search for the design element in the design element section 704. Once the user 202 has selected a category, for example the wall and floor treatment 710, the user 202 may select the method of searching from the find design element section 706. The methods of searching for a design element include the Internet 718, a captured image 720 or from a retail store 722. If the user 202 selects the Internet 718, the user 202 is directed to a search engine to search for the design element. For example, if the user is looking for a specific paint color to virtually view on the user's 202 design space, the user 202 may select the wall and floor treatment section 710 then search the Internet 718 for the specific color the user 202 wants to visualize. The user 202 may then add the color to his/her directory by selecting the add button. Once the user 202 has added the color to the directory he/she may apply the color to his/her design space and virtually view the color in his/her space. In this way, the user 202 may determine if the color is the one he/she would like to paint the walls of his/her space with prior to any paint being applied to the walls of the space.

If the user 202 has previously captured an image of a design element from one of the categories, the user 202 may select the captured image section 720 and up-load the image. In this way, the system may incorporate that design element into the design space of the user 202. The capturing of an image may have occurred using the mobile device, a computer, camera, or the like.

The user 202 may also search retailers for design items in section 722. Retailers may include a retail store, a business, a website of a retailer or business, designer line, celebrity line, or the like. For example, a user 202 may be in a retail store that carries design elements. The user 202 may see a design element that he/she would like to include in his/her design space. Therefore, the user 202 may capture the design element and store it in the directory for positioning in his/her design space.

Once the user 202 has found the design elements desired, the user 202 may add the design elements to a directory for the system to incorporate the design elements into the user's 202 design space. In some embodiments, the system is able to position the element in the user's 202 design space immediately. For example, if the user 202 captures an image of a design element at a retail store, the system may instantly position the element within the user's 202 design space. In this way, the user 202 may have a virtual image of his/her design space with the design element, so that the user 202 may decide if he/she wishes to purchase that design element at the retailer.

Adding design elements from the directory may be done by the user 202 in the design space section 708 of the selection interface 700. In the design space section 708 the user 202 may select the design space to add the element to in section 724. For example, a user 202 may have multiple design spaces he/she is designing. In this instance the user 202 may be an interior designer and have several clients in which he/she is currently designing rooms for. In this way, the user 202 may select which design space he/she would like to add a design element to in section 724. In section 724 the user 202, in this example, has three design spaces to select from space 1, space 2, and space 3. Once the user 202 has selected a design space to include the design element in, the user 202 may select the location of the design element in section 726. In this way, the user 202 may move the design element to the location within the design space that he/she would like the design element to be positioned. The system will provide a recommended location to the user 202 for the design element, but the user 202 may position the element any location he/she desires. In this way, the user 202 may virtually view his/her design space with the design element in it. For example, the user 202 may visualize the design space with the design element in it on the display of the mobile device 204. The user 202 would not have to purchase the design element and bring it to the design space to determine if the design element is what the user 202 wants for the space, instead the user 202 may virtually view the design space with the design element. In another embodiment, the user 202 may capture the virtual design space and the system may communicate the design space to friends and/or family members of the user 202 through social networks, picture message, emailing, text messaging, or the like. In this way, friends or family members of the user 202 may vote on or comment about whether they "like" or "dislike" the user's 202 design choices.

After the user 202 has selected the design element and positioned the design element in the desired location within the design space, the user 202 may purchase the design element in section 728. If the user 202 found the design element online, at a retail store, in a magazine, in a showroom, or the like the system will find the design element or a similar design element and provide a link for the user 202 to purchase the design element. The system may directly connect with the user's 202 financial institution to provide an easy payment method for the user 202. Once the user 202 has completed using the selection interface 700 the user 202 may select the finished button 730 so that the system may store the manual inputs from the user 202.

Using the selection interface 700 or other means, the user 202 may provide manually inputted design elements that the user 202 may wish to include in to his/her design space. The user 202 may add these design elements at any time convenient to the user 202. Design elements may also be provided by the user 202 through social networks the user 202 may subscribe to.

Returning to FIG. 6, after the system has received a captured image of a design element or the user 202 has provided manual input, factors of the design space are analyzed to determine a recommended location of the design elements in block 612. Once the factors are analyzed for providing a recommended design element into a design space in block 612, in decision block 614, a determination is made as to whether the mobile device is still capturing video stream of the design elements. If no video stream is being captured then no indicator is presented in block 616. If a video stream is still being captured, then in block 618 indicators are continuing to be presented with respect to the design elements. The indicators are associated with a design element the user 202 may visualize in a virtual design space environment. In some embodiments, the user 202 may select the indicator. The selected indicator may allow the user 202 to obtain further detail about the design element. Further details about the design element may include dimensions of the element, specifications associated with the element, color options for the element, or other similar elements that would fit in the space.

If the user 202 selects the indicator in block 620, the user 202 may have the option of purchasing the design element in block 622. The indicator may provide the user 202 with the best price of the design element. For example, the user 202 may be at a retail store, but the indicator may provide the user 202 with an offer to purchase the same design element for a discounted rate as compared to the retail store. Therefore, the user 202 may elect to purchase the design element from the indicator instead of the retail store. Furthermore, the system may provide the user 202 with a direct link to the user's 202 financial institution, so that if the user 202 chooses to purchase the design element, the user 202 may do so without communicating a payment method.

In some embodiments, if the user 202 selects the indicator in block 620, the system may recommend the user 202 not to purchase the design element. The system may analyze the design element selected compared to the design space of the user 202 and determine that the design element does not match or fit into the design space. Therefore, the system may recommend the user 202 not purchase the design element. If this occurs, the system may provide the user 202 with other alternative design elements that are similar to the selected design element that may match the user's 202 design area.

In various embodiments, information associated with or related to one or more objects that is retrieved for presentation to a user 202 via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device 204 provides the user 202 an opportunity to post messages, links to information or the like and associate such postings with the object. Subsequent users may then be presenting such postings when their mobile devices capture and recognize an object. In some embodiments, the information gathered through the recognition and information retrieval process may be posted by the user 202 in association with the object. Such tags and/or postings may be stored in a predetermined memory and/or database for ease of searching and retrieval.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as user financial behavior history, user purchase power/transaction history and the like. In this regard, many of the embodiments herein disclosed leverage financial institution data, which is uniquely specific to financial institution, in providing information to mobile devices users in connection with real-time video stream analysis.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The systems, methods, computer program products, etc. described herein, may be utilized or combined with any other suitable AR-related application. Non-limiting examples of other suitable AR-related applications include those described in the following U.S. Provisional patent applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

What is claimed is:

1. A method for providing interior design recommendations, the method comprising:
   receiving a captured image of an interior area for the interior design from a user;
   building a directory of data relating to the interior area to design, wherein the directory comprises information regarding characteristics of the interior area to design;
   receiving information about products from a mobile device, wherein the products are to be incorporated in the interior area to design;
   identifying the products associated with the received information about products;
   matching the product with the directory of data relating to the interior area to design, through the use of a processing device; and
   presenting the products and indicators associated with the products, via the mobile device of a user, over the captured image of the area to design, wherein the user may position the products within the captured image of the interior area to design, wherein presenting the products and the indicators associated with the products comprises superimposing the products and the indicators associated with the products over real-time video that is captured by the mobile device, of the interior area to design.

2. The method of claim 1, wherein the directory comprises information regarding dimensions of the area.

3. The method of claim 1, wherein the directory further comprises geographical location indications of the area.

4. The method of claim 1, wherein the directory further comprises prior decorating information of the user.

5. The method of claim 1, wherein the receiving product information comprises manually inputted data, wherein the manually inputted data indicates user products preferences.

6. The method of claim 1, wherein the products include furniture to be incorporated into the area to design.

7. The method of claim 1, wherein the products include decorative items to be incorporated into the area to design.

8. The method of claim 1, wherein the receiving product information comprises real-time imaging of a product.

9. The method of claim 1, wherein identifying the products associated with the received information about products further comprises capturing a tag located on or proximate to the product and reading the tag to identify the product.

10. The method of claim 1, wherein presenting an indicator associated with the product comprises displaying the indicator on a display of the mobile device.

11. The method of claim 1, wherein presenting an indicator associated with the product comprises superimposing the indicator over real-time video that is captured by the mobile device.

12. The method of claim 1, wherein the indicator is selectable by the user.

13. The method of claim 1, wherein the indicator, upon being selected, provides the user an offer to purchase the product for the interior design.

14. A system for providing landscaping design recommendations, comprising:
a memory device;
a communication device;
a processing device operatively coupled to the memory device and the communication device, wherein the processing device is configured to execute computer-readable program code to:
receive a captured image of an interior area for the interior design from a user;
build a directory of data relating to the interior area to design, wherein the directory comprises information regarding characteristics of the interior area to design;
receive information about products from a mobile device, wherein the products are to be incorporated in the interior area to design;
identify the products associated with the received information about products;
match the product with the directory of data relating to the interior area to design; and
present the products and indicators associated with the products, via the mobile device of a user, over the captured image of the area to design, wherein the user may position the products within the captured image of the interior area to design, wherein presenting the products and the indicators associated with the products comprises superimposing the products and the indicators associated with the products over real-time video that is captured by the mobile device, of the interior area to design.

15. The system of claim 14, wherein the directory comprises information regarding dimensions of the area.

16. The system of claim 14, wherein the directory further comprises geographical location indications of the area.

17. The system of claim 14, wherein the directory further comprises prior decorating information of the user.

18. The system of claim 14, wherein the receiving product information comprises manually inputted data, wherein the manually inputted data indicates user products preferences.

19. The system of claim 14, wherein the products include furniture to be incorporated into the area to design.

20. The system of claim 14, wherein the products include decorative items to be incorporated into the area to design.

21. The system of claim 14, wherein the receiving product information comprises real-time imaging of a product.

22. The system of claim 14, wherein identifying the products associated with the received information about products further comprises capturing a tag located on or proximate to the product and reading the tag to identify the product.

23. The system of claim 14, wherein presenting an indicator associated with the product comprises displaying the indicator on a display of the mobile device.

24. The system of claim 14, wherein presenting an indicator associated with the product comprises superimposing the indicator over real-time video that is captured by the mobile device.

25. The system of claim 14, wherein the indicator is selectable by the user.

26. The system of claim 14, wherein the indicator, upon being selected, provides the user an offer to purchase the product for the interior design.

27. A computer program product for providing landscaping design recommendations, the computer program product comprising at least one non-transitory computer-readable medium having computer-readable program code portions embodied therein, the computer-readable program code portions comprising:
an executable portion configured for receiving a captured image of an interior area for the interior design from a user;
an executable portion configured for building a directory of data relating to the interior area to design, wherein the directory comprises information regarding characteristics of the interior area to design;
an executable portion configured for receiving information about products from a mobile device, wherein the products are to be incorporated in the interior area to design;
an executable portion configured for identifying the products associated with the received information about products;
an executable portion configured for matching the product with the directory of data relating to the interior area to design; and
an executable portion configured for presenting the products and indicators associated with the products, via the mobile device of a user, over the captured image of the area to design, wherein the user may position the products within the captured image of the interior area to design, wherein presenting the products and the indicators associated with the products comprises superimposing the products and the indicators associated with the products over real-time video that is captured by the mobile device, of the interior area to design.

28. The computer program product of claim 27, wherein the directory comprises information regarding dimensions of the area.

29. The computer program product of claim 27, wherein the directory further comprises geographical location indications of the area.

30. The computer program product of claim 27, wherein the directory further comprises prior decorating information of the user.

31. The computer program product of claim 27, wherein the receiving product information comprises manually inputted data, wherein the manually inputted data indicates user products preferences.

32. The computer program product of claim 27, wherein the products include furniture to be incorporated into the area to design.

33. The computer program product of claim 27, wherein the products include decorative items to be incorporated into the area to design.

34. The computer program product of claim 27, wherein the receiving product information comprises real-time imaging of a product.

35. The computer program product of claim 27, wherein identifying the products associated with the received information about products further comprises capturing a tag located on or proximate to the product and reading the tag to identify the product.

36. The computer program product of claim 27, wherein presenting an indicator associated with the product comprises displaying the indicator on a display of the mobile device.

37. The computer program product of claim 27, wherein presenting an indicator associated with the product comprises superimposing the indicator over real-time video that is captured by the mobile device.

38. The computer program product of claim 27, wherein the indicator is selectable by the user.

39. The computer program product of claim 27, wherein the indicator, upon being selected, provides the user an offer to purchase the product for the interior design.

* * * * *